United States Patent
Wu et al.

(10) Patent No.: US 11,811,687 B2
(45) Date of Patent: *Nov. 7, 2023

(54) SYSTEMS AND METHODS FOR PROVIDING HIGH DATA THROUGHPUT IN 6 GHZ WI-FI NETWORK

(71) Applicant: Samsung Electronics Co., Ltd., Suwon-si (KR)

(72) Inventors: Tianyu Wu, Fremont, CA (US); Wook Bong Lee, San Jose, CA (US); Minyoung Park, San Ramon, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/824,600

(22) Filed: May 25, 2022

(65) Prior Publication Data
US 2022/0294584 A1  Sep. 15, 2022

Related U.S. Application Data

(63) Continuation of application No. 16/875,020, filed on May 15, 2020, now Pat. No. 11,362,775, which is a
(Continued)

(51) Int. Cl.
*H04W 4/00* (2018.01)
*H04L 5/00* (2006.01)
(Continued)

(52) U.S. Cl.
CPC .......... *H04L 5/0041* (2013.01); *H04L 5/0012* (2013.01); *H04L 5/0035* (2013.01);
(Continued)

(58) Field of Classification Search
None
See application file for complete search history.

(56) References Cited

U.S. PATENT DOCUMENTS 9,319,202 B2    4/2016  Aboul-Magd et al.
9,923,581 B2    3/2018  Emmanuel et al.
(Continued)

OTHER PUBLICATIONS

Hetting, Claus, "New research says 6 GHz is ready for Wi-Fi," Jan. 28, 2018, pp. 1-3 (https://wifinowevents.com/news-and-blog/tech-leaders-push-fcc-wi-fi-spectrum-6-ghz-band/).
(Continued)

*Primary Examiner* — Zewdu A Beyen
(74) *Attorney, Agent, or Firm* — Lewis Roca Rothgerber Christie LLP

(57) ABSTRACT

A method for allowing wireless communication between an access point and a wireless station in a wireless communication network includes: providing at least one from a combination of a 2.4 GHz frequency band and a 5 GHz frequency band; providing a frequency band including a 6 GHz frequency band for allowing wireless data communication; assigning a first data communication channel having a first frequency bandwidth in the frequency band including the 6 GHz frequency band between the access point and the wireless station; and transmitting data packets between the access point and the wireless station via the first data communication channel in the frequency band including the 6 GHz frequency band. Each of the 2.4 GHz frequency band and the 5 GHz frequency band includes a plurality of subchannels having a first base frequency bandwidth of 20 MHz, and the frequency band including the 6 GHz frequency band includes a plurality of subchannels having a second base frequency bandwidth that is larger than the first base frequency bandwidth.

19 Claims, 13 Drawing Sheets

Related U.S. Application Data continuation of application No. 16/209,685, filed on Dec. 4, 2018, now Pat. No. 10,742,374.

(60) Provisional application No. 62/731,705, filed on Sep. 14, 2018, provisional application No. 62/616,869, filed on Jan. 12, 2018.

(51) Int. Cl.
*H04W 88/06* (2009.01)
*H04W 72/0453* (2023.01)
*H04W 28/26* (2009.01)

(52) U.S. Cl.
CPC .......... *H04L 5/0039* (2013.01); *H04L 5/0046* (2013.01); *H04L 5/0053* (2013.01); *H04L 5/0092* (2013.01); *H04W 72/0453* (2013.01); *H04W 88/06* (2013.01); *H04W 28/26* (2013.01)

(56) References Cited

U.S. PATENT DOCUMENTS

| | | |
|---|---|---|
| 2014/0269461 A1 | 9/2014 | Mehta |
| 2017/0188376 A1 | 6/2017 | Noh et al. |
| 2017/0223693 A1 | 8/2017 | Kim et al. |
| 2017/0264475 A1* | 9/2017 | Son ..................... H04L 1/0063 |
| 2018/0139635 A1* | 5/2018 | Oteri ................... H04W 84/12 |
| 2018/0145919 A1 | 5/2018 | Kalikot Veetil et al. |
| 2019/0045444 A1* | 2/2019 | Huang ................. H04W 76/28 |
| 2019/0109699 A1 | 4/2019 | Liu et al. |
| 2019/0158413 A1 | 5/2019 | Patil et al. |

OTHER PUBLICATIONS

Communication corresponding to Taiwan Application No. 108101093 and issued by Taiwan Intellectual Property Office dated Jan. 27, 2022, 9 pages.

* cited by examiner

SYSTEMS AND METHODS FOR PROVIDING HIGH DATA THROUGHPUT IN 6 GHZ WI-FI NETWORK

CROSS REFERENCE TO RELATED APPLICATIONS

This application is a continuation of U.S. patent application Ser. No. 16/875,020, filed May 15, 2020, which is a continuation application of U.S. patent application Ser. No. 16/209,685, filed Dec. 4, 2018, now U.S. Pat. No. 10,742,374, which claims priority to U.S. Provisional Patent Application No. 62/616,869, entitled METHOD OF UTILIZING THE 6 GHZ FREQUENCY BAND FOR NEXT GEN WI-FI STANDARD, filed Jan. 12, 2018, and U.S. Provisional Patent Application No. 62/731,705, entitled METHOD OF UTILIZING THE 6 GHZ FREQUENCY BAND FOR NEXT GEN WI-FI STANDARD, filed Sep. 14, 2018, the disclosures of which are incorporated herein by reference in their entirety.

FIELD OF THE DISCLOSURE

The present disclosure relates to wireless communication systems and methods and, in particular, to a wireless communication system and method for providing high data throughput in a 6 GHz Wi-Fi network.

BACKGROUND

Wireless local area networks (WLANs) implemented using the Institute of Electrical and Electronics Engineers (IEEE) 802.11 standards are widely used for enabling wireless communication between wireless devices in home and office environments and for providing wireless devices with an access to the Internet without connecting wires. The IEEE 802.11 is a set of wireless computer networking standards (also referred to as Wi-Fi standards) for implementing Ethernet-based WLAN computer communication in specified frequency bands, such as the 2.4 and 5 GHz frequency bands. The IEEE 802.11 standards define rules for configuring an Ethernet-based network as well as the connectivity and protocols of constituent network equipment and wireless devices in the Ethernet-based network. By adhering to the IEEE 802.11 standards, the network equipment and the wireless devices can communicate efficiently.

In general, a WLAN include a plurality of wireless devices, also referred to as wireless stations or wireless clients. The wireless stations may be mobile devices, such as a mobile phone, a tablet computer, or a laptop computer. In other cases, the wireless stations may be secondary devices such as a printer or a desktop computer. The wireless stations can communicate directly with each other on a wireless channel in a so-called "ad-hoc" network. Alternately, the wireless stations may communicate through a base station, also referred to as an access point (AP) in a so-called "infrastructure-based" network.

Currently, WLANs implementing the IEEE 802.11 standards operate in 2.4 GHz and/or 5 GHz frequency bands. The 2.4 GHz frequency band extends from 2.4 GHz to 2.483 GHz, and the 5 GHz frequency band extends from 5.15 GHz to 5.825 GHz. Recently, the United States and other countries consider using a 6 GHz frequency band (e.g., 5.925-6.425 GHz) as an unlicensed frequency spectrum to provide an additional frequency spectrum to the current 2.4 GHz and/or 5 GHz frequency bands to meet the ever increasing demands of (Wi-Fi) Internet traffic. Since the 6 GHz frequency band is adjacent to the 5 GHz frequency band (one of the Unlicensed National Information Infrastructure (U-NII) frequency bands) that is heavily used by 802.11 wireless networks, the 6 GHz frequency band can be advantageously applied to enhance the Wi-Fi performance of WLANs. The IEEE 802.11ax standard is being developed as the specification for the next generation of WLANs, which includes operations in the 2.4 GHz, 5 GHz, and 6 GHz frequency bands. The IEEE 802.11ax is designed to enhance efficiency of Wi-Fi traffic for dense scenarios with modest improvement over a peak data rate.

SUMMARY

The present disclosure discloses a device and method for controlling a connected device in a mobile device, substantially as shown in and/or described below, for example in connection with at least one of the figures, as set forth more completely in the claims.

These and other advantages, aspects, and novel features of the present disclosure, as well as details of an illustrated embodiment thereof, will be more fully understood from the following description and drawings.

According to one embodiment, a method for allowing wireless communication between an access point and a wireless station in a wireless communication network includes: providing at least one from a combination of a 2.4 GHz frequency band and a 5 GHz frequency band; providing a frequency band including a 6 GHz frequency band for allowing wireless data communication; assigning a first data communication channel having a first frequency bandwidth in the frequency band including the 6 GHz frequency band between the access point and the wireless station; and transmitting data packets between the access point and the wireless station via the first data communication channel in the frequency band including the 6 GHz frequency band. Each of the 2.4 GHz frequency band and the 5 GHz frequency band includes a plurality of subchannels having a first base frequency bandwidth of 20 MHz, and the frequency band including the 6 GHz frequency band includes a plurality of subchannels having a second base frequency bandwidth that is larger than the first base frequency bandwidth.

According to another embodiment, a wireless data communication system includes: an access point; and a wireless station capable of communicating with the access point. The wireless communication system provides at least one of a 2.4 GHz frequency band and a 5 GHz frequency band for allowing wireless data communication between the access point and the wireless station, and wherein each of the 2.4 GHz frequency band and the 5 GHz frequency band includes a plurality of subchannels having a first base frequency bandwidth of 20 MHz. The wireless communication system further provides a frequency band including a 6 GHz frequency band for allowing wireless data communication between the access point and the wireless station, and wherein the frequency band including the 6 GHz frequency band includes a plurality of subchannels having a second base frequency bandwidth that is larger than the first base frequency bandwidth. The wireless communication system assigns a first data communication channel having a first frequency bandwidth in the frequency band including the 6 GHz frequency band between the access point and the wireless station. The wireless communication system transmits data packets between the access point and the wireless station via the first data communication channel in the frequency band including the 6 GHz frequency band.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
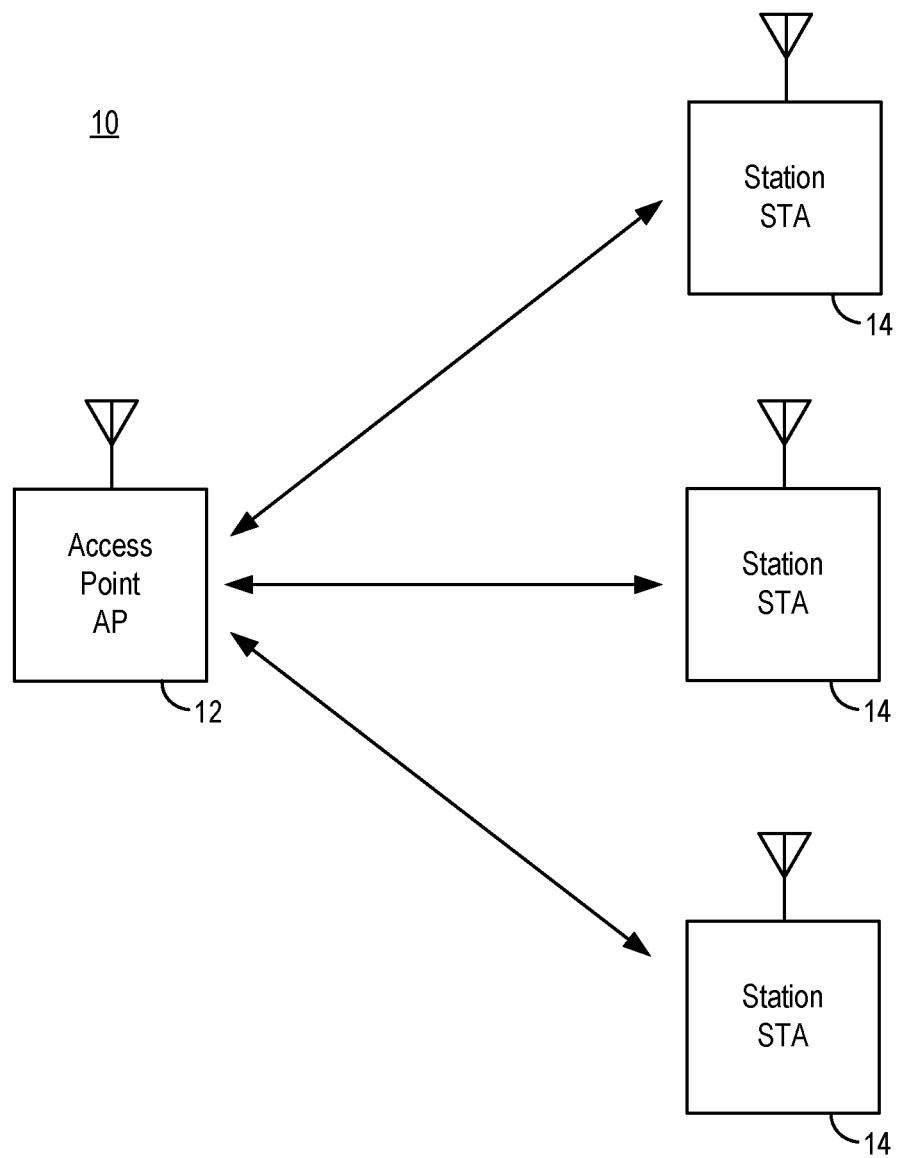
FIG. 1 is a system diagram illustrating an environment in which the present wireless communication systems and methods can be applied according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a wireless communication system and method for providing high data throughput using a 6 GHz frequency bandwidth in addition to a 2.4 GHz or 5 GHz frequency band. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The current-generation Wi-Fi standard uses a common channel to transmit management and data frames. In a congested environment, management frames such as beacon or probe request/response frames can consume wireless medium and resultantly can degrade data throughput. In addition, the current-generation Wi-Fi standard uses a common channel for uplink (station to access point) and downlink (access point to station), and therefore the transmission range is limited by the transmission range of the uplink because the transmit power of the station is typically much lower than the transmit power of the access point.

In the United States and other countries, a 6 GHz frequency band (e.g., 5.925-7.125 GHz) is being considered for an unlicensed spectrum that can be used for Wi-Fi. According to embodiments of the present disclosure, wireless communication systems and methods provide wireless communication in a 6 GHz frequency band together with 2.4 and 5 GHz frequency bands to enhance the throughput performance and reliability of Wi-Fi data communication. The present disclosure can contribute to define the next generation Wi-Fi standard after the IEEE 802.11ax standard.

The current IEEE 802.11ax standard focuses on the enhancement to the efficiency of Wi-Fi traffic for dense scenarios. In a typical operating environment, the peak physical layer (PHY) rate of the IEEE 802.11ax standard is incrementally increased by just 1.4 times compared to the previous generation IEEE 802.11ac standard. However, the IEEE 802.11ax standard is not designed to specifically improve the Wi-Fi performance in terms of the peak PHY rate.

According to one embodiment, the present wireless systems and methods utilize a 6 GHz frequency band as a high-throughput data link together with the 2.4 and 5 GHz frequency band links. The range of the 6 GHz frequency band may slightly deviate from the currently considered frequency band, i.e., 5.925-7.125 GHz range, and it may vary depending on the definition of the next-generation Wi-Fi standard.

According to one embodiment, the present systems and methods define a wider channelization (e.g., 80 MHz) in the 6 GHz frequency band compared to 20 MHz channelization in the 2.4 or 5 GHz frequency band. The 80 MHz channelization of the 6 GHz frequency band may avoid a coexistence problem between 20, 40, and 80 MHz signals in the 2.4 or 5 GHz frequency band, and thus it can have a more efficient medium access for high-throughput applications.

According to one embodiment, the present systems and methods define a new 320 MHz operation mode utilizing the 6 GHz frequency band or both 5 and 6 GHz frequency bands. The 320 MHz operation mode can double the peak PHY rate in comparison with the IEEE 802.11ac standard.

FIG. 1 is a system diagram illustrating an environment in which the present wireless communication systems and methods can be applied according to one embodiment. A wireless communication system 10 includes an access point (AP) 12 that may communicate with one or more wireless stations (STAs) 14. The wireless communication system 10 can be a wireless local area network (WLAN) implemented using any of the IEEE 802.11 standards. The access point 12 can communicate with one or more wireless stations 14 with which it is associated using a shared local area network protocol and over one or more shared frequency spectrum band. For example, the access point 12 and the wireless stations 14 may communicate in the 2.4 GHz frequency band, the 5 GHz frequency band, the 6 GHz band, or any combination of these frequency bands. In actual implementations, a WLAN may include one or more access points communicating to a large number of wireless stations.

In the present disclosure, the wireless station 14 is also referred to as a station or a wireless client. For example, the wireless station 14 may be a mobile device, such as a mobile phone, a tablet computer, or a laptop computer. In other examples, the wireless station 14 may be a secondary device such as a printer or a desktop computer. The wireless stations 14 in the wireless communication network can communicate directly with each other on a wireless channel in an ad-hoc network. In addition, the wireless stations 14 may communicate through an access point, herein also referred to as a base station, in an infrastructure-based network. The access point 12 may be connected to a data network, such as the Internet, and enables a wireless station 14 to communicate with other nodes (e.g., other wireless stations 14) or access the data network.

In the present disclosure, access points and wireless stations in a WLAN may be referred to collectively as wireless communication devices or wireless devices. In a typical configuration, a wireless communication device includes a transceiver (transmitter/receiver) that converts radio signals received on an antenna into digital signals and processors for processing data packets.

Figure 2:
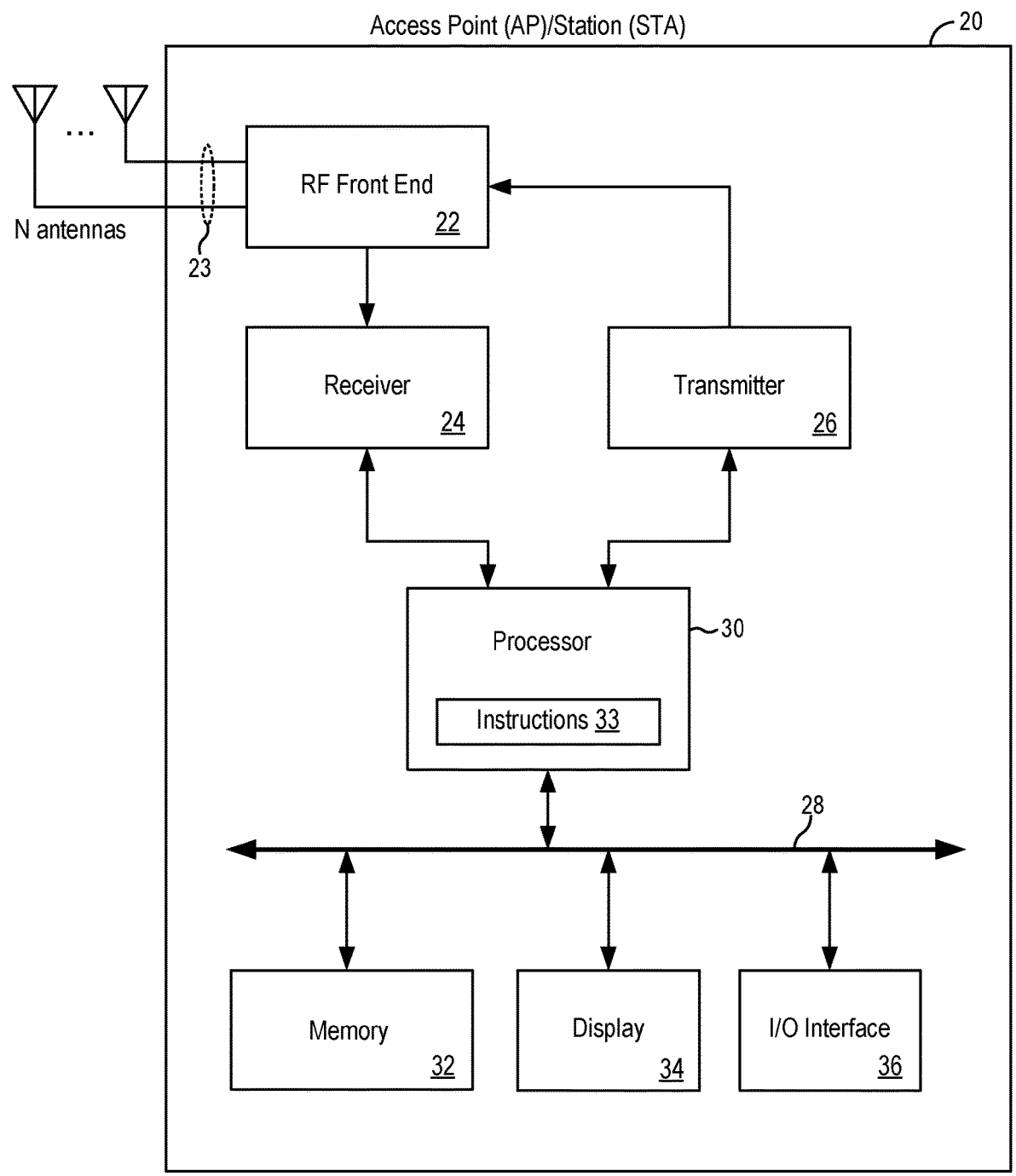
FIG. 2 is a schematic diagram of a wireless device according to one embodiment.

FIG. 2 is a schematic diagram of a wireless device according to one embodiment. It is understood that FIG. 2 is only representative of a generic wireless device and that in actual implementations, the wireless device may use various configurations and include other elements not shown in FIG. 2. A wireless device 20 may be configured as an access point 12 or a wireless station 14 shown in FIG. 1. The wireless device 20 may include one or more antennas 23 that are coupled to a radio frequency (RF) front end 22. A receiver circuit 24 and a transmitter circuit 26 are coupled to the RF front end 22 and receive signals from and transmit signals to the antennas 23.

The wireless device 20 includes a processor 30 for controlling the operation of the wireless device 20. The processor 30 executes instructions 33 to perform various operations for receiving and transmitting data packets. The processor 30 may be in communication with a system bus 28. Through the system bus 28, the processor 30 can communicate with one or more system components of the wireless station 20. For example, the wireless station 20 may include a memory 32 for storing the instructions 33 and other data, a display 34, and an I/O interface 36 for interfacing with a user or for providing a status to the user.

When configured as an access point, the wireless device 20 may be arranged to establish connection to one or more wireless stations, process resource allocation requests received from the associated wireless stations, and transmit data packets to and receive data packets from the associated wireless stations. When configured as a wireless stations, the wireless device 20 may be arranged to establish connection to another wireless device, such as an access point or another wireless station, and transmit and receive data packets.

In embodiments of the present disclosure, the wireless communication systems and methods are configured to utilize the 6 GHz frequency band together with the 2.4 GHz frequency band and/or the 5 GHz frequency band that are defined in the IEEE 801.11ac standard. In one embodiment, the 6 GHz frequency band as defined herein may cover a range between 5.925 GHz and 7.125 GHz. However, the range of the 6 GHz frequency band may slightly deviate from the 5.925-7.125 GHz range, and it may vary without deviating from the scope of the present disclosure.

According to one embodiment, the present wireless communication systems and methods may implement various channelization and operation rules for utilizing the 6 GHz frequency band with the 2.4 GHz and 5 GHz frequency bands that are defined in the IEEE 801.11ac standard to increase data throughput and improve network performance. In some embodiments, the WLAN 10 of FIG. 1 implements the wireless communication systems and methods described herein to facilitate data transmission between the access point 12 and the wireless stations 14.

(1) Wide Channelization for High Throughput Link

According to one embodiment, the present wireless communication systems and methods are used for data transmission in a wireless local area network. The present wireless communication systems and methods implement a channelization scheme where transmission in the 6 GHz frequency band uses a first base frequency bandwidth that is wider than a second base frequency bandwidth that is used in the 2.4 GHz and/or 5 GHz frequency bands. The total operation bandwidth in the 6 GHz frequency band may not be wider than that in the 2.4 GHz and/or 5 GHz frequency bands. For example, a 160 MHz bandwidth channel in the 5 GHz frequency band and an 80 MHz bandwidth channel in the 6 GHz frequency band may be used. More specifically, the present wireless communication systems and methods allows transmission and receipt of data packets in the 6 GHz frequency band using frequency channels having the first channel bandwidth, and transmits and receives data packets in the 2.4 GHz and/or 5 GHz frequency bands using frequency channels having the second channel bandwidth.

In general, data communication over a wireless communication link is carried out in a channel bandwidth of the corresponding frequency band. In the 2.4 and 5 GHz frequency bands, the base unit of the channel bandwidth is 20 MHz, but 40 MHz and 80 MHz signal bandwidths are also supported by bonding two or more 20 MHz channels. While the channel bonding can increase a PHY rate, it also creates a coexistence problem between the 20 MHz and 40/80 MHz signals.

Figure 3A:
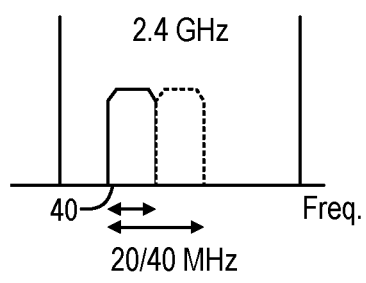
FIG. 3A illustrates an example channelization of the 2.4 GHz frequency band according to one embodiment.

FIG. 3A illustrates an example channelization of the 2.4 GHz frequency band according to one embodiment. The 2.4 GHz frequency band has a base channel bandwidth 40. In one embodiment, the base channel bandwidth 40 is 20 MHz. The 2.4 GHz frequency band supports both 20 MHz and 40 MHz signal bandwidths channels by bonding two base 20 MHz channels.

Figure 3B:
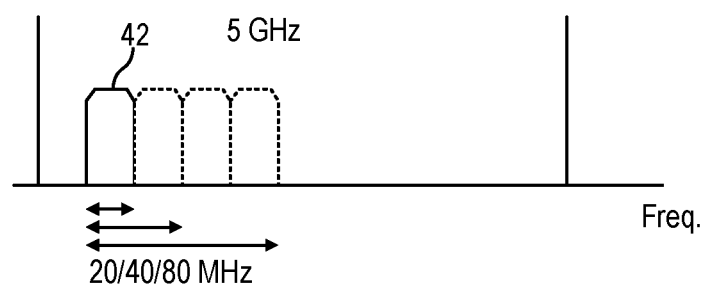
FIG. 3B illustrates an example channelization of the 5 GHz frequency band according to one embodiment.

FIG. 3B illustrates an example channelization of the 5 GHz frequency band according to one embodiment. The 5 GHz frequency band has a base channel bandwidth 42. In one embodiment, the base channel bandwidth 42 is 20 MHz. The 5 GHz frequency band supports 20 MHz, 40 MHz, 80 MHz, and 160 MHz signal bandwidths channels by bonding two or four base 20 MHz channels.

Figure 3C:
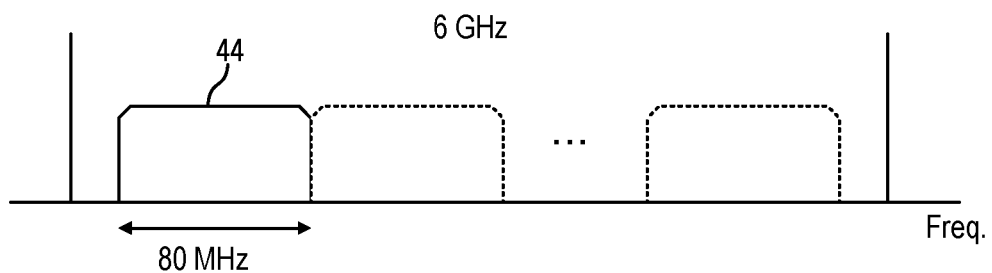
FIG. 3C illustrates an example channelization of the 6 GHz frequency band according to one embodiment.

FIG. 3C illustrates an example channelization of the 6 GHz frequency band according to one embodiment. The 6 GHz frequency band has a base channel bandwidth 44 that is wider that the base channel widths 40 and 42 of the 2.4 GHz and 5 GHz frequency bands. The 6 GHz frequency band supports both 80 MHz, 160 MHz, and 320 MHz signal bandwidths channels by bonding two or four base 80 MHz channels.

According to one embodiment, the 6 GHz frequency band is used for high-throughput applications that need frequent access to wide channels (e.g., 80 MHz or greater). The wider channel bandwidth 44 is used as a base unit for the channelization in the 6 GHz frequency band so that the high-throughput applications can have easier access to the wide channels without blocked by narrower bandwidth signals and eliminate the coexistence problem between 20, 40, and 80 MHz channels.

Figure 4:
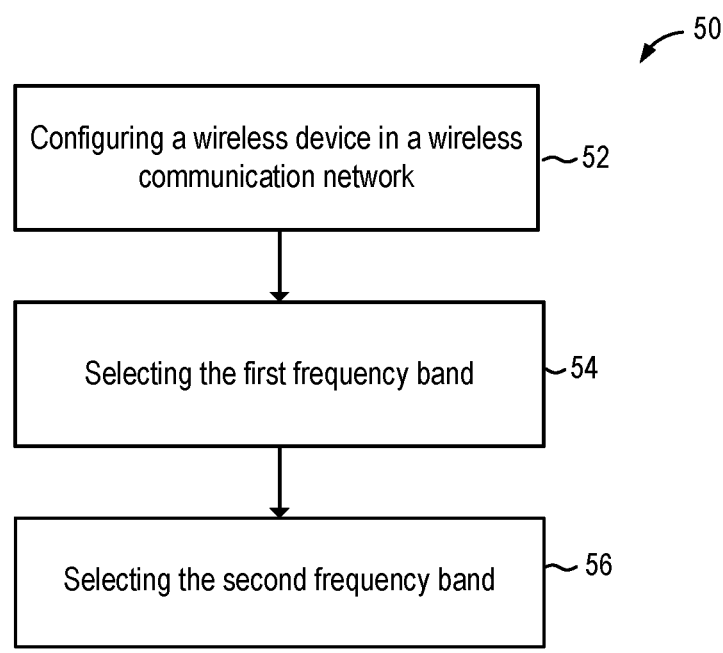
FIG. 4 is a flowchart for configuring frequency bands of a wireless device in a wireless communication network including the 6 GHz frequency band according to one embodiment.

FIG. 4 is a flowchart 50 for configuring frequency bands of a wireless device in a wireless communication network including the 6 GHz frequency band according to one embodiment. A user configures the wireless device and the wireless communication network to use at least two frequency bands including the 6 GHz frequency band (at 52). The first frequency band including the 2.4 GHz frequency band and/or the 5 GHz frequency band is selected (at 54). In addition, the second frequency band, i.e., the 6 GHz frequency band is selected (at 56). It is understood that the selection order of the first frequency band and the second frequency band may be changed, i.e., the first frequency band is selected in the 6 GHz frequency band, and the second frequency band is selected in the 2.4 GHz frequency band and/or the 5 GHz frequency bands. Alternatively, the selection of the first frequency band and the second frequency band may be made concurrently or independently. The 2.4 GHz frequency band has a base channel bandwidth of 20 MHz but can support both 20 MHz and 40 MHz signal bandwidths channels by bonding two base 20 MHz channels. The 5 GHz frequency band has a base channel bandwidth of 20 MHz as well and can support 20 MHz, 40 MHz, 80 MHZ, and 160 MHz signal bandwidths channels by bonding two, four, or eight base 20 MHz channels.

Depending on the configuration of the wireless device and the wireless communication network, data packets are transmitted over the wireless communication network via the multiple frequency bands. For example, the second frequency band (i.e., the 6 GHz frequency) band is used for carrying data packets for high-throughput applications using a wider channel bandwidth (e.g., 80 MHz or greater) whereas the first frequency band (i.e., the 2.4 GHz and 5 GHz frequency bands) is used for carrying narrower bandwidth data packets such as uplink data frames or management data frames. However, it is understood that the data packets for the high-throughput applications and the narrower bandwidth data packets may be split into the first frequency band and the second frequency band without deviating from the scope of the present disclosure.

(2) 320 MHz Bandwidth Channel in an Intra-Band or Inter-Band Mode

Figure 5:
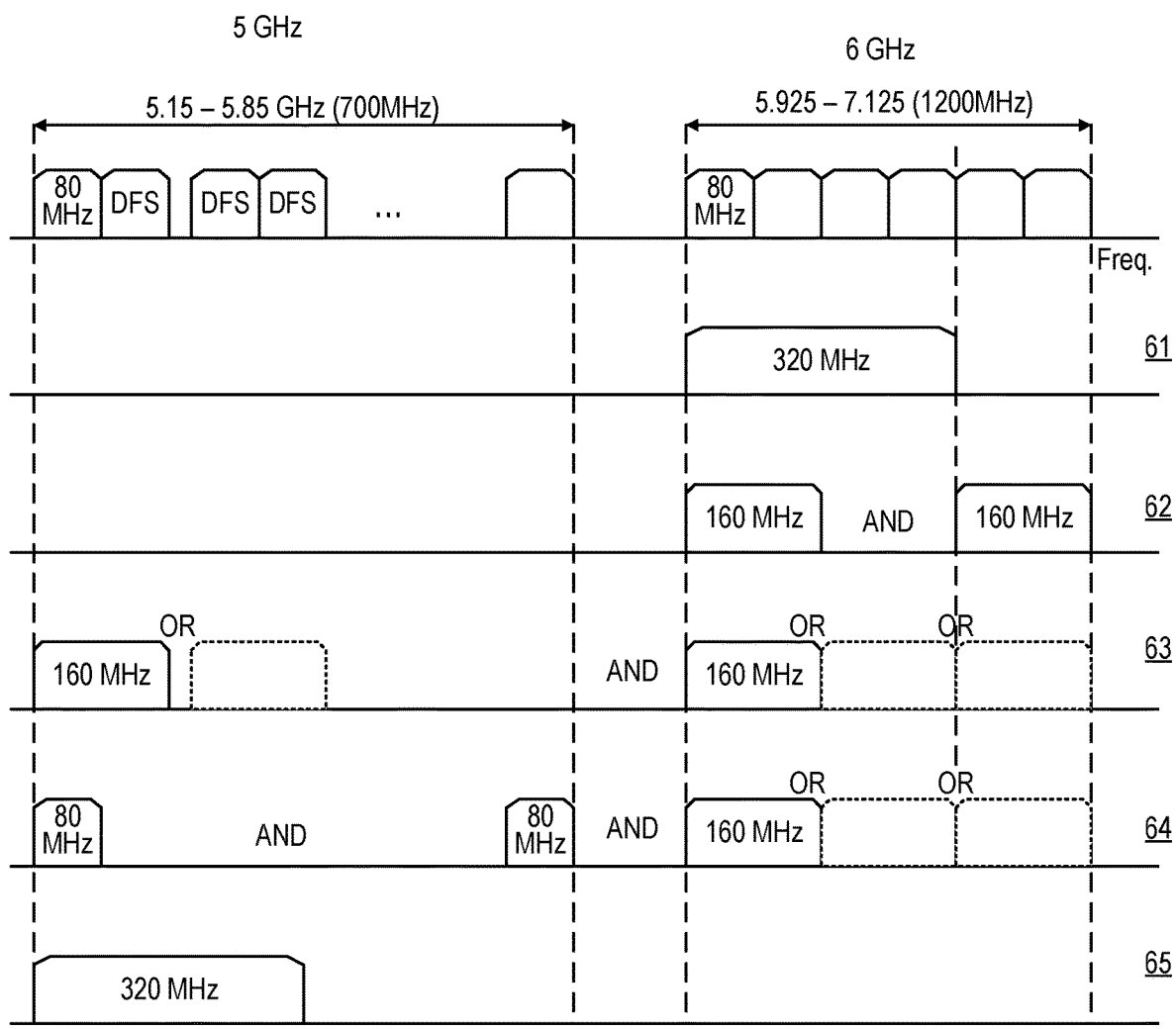
FIG. 5 illustrates several modes for implementing and utilizing a 320 MHz bandwidth channel in a wireless communication network according to one embodiment.

FIG. 5 illustrates several modes for implementing and utilizing a 320 MHz bandwidth channel in a wireless communication network according to one embodiment. According to the IEEE 802.11ac standard, the 5 GHz frequency band is defined to cover a frequency range between 5.15 GHz and 5.85 GHz so that the channel bandwidth of the 5

GHz frequency band is 700 MHz wide. According to one embodiment, the 6 GHz frequency band is defined to cover a frequency range between 5.925 GHz and 7.125 GHz so that the available channel bandwidth of the 6 GHz frequency band is 1200 MHz side.

According to some embodiments, the wireless communication network in which the present wireless devices are implemented can support the 320 MHz bandwidth channel in an intra-band mode and an inter-band mode. In the intra-band mode, the present wireless devices utilize the 320 MHz bandwidth channel in either the 5 GHz frequency band or the 6 GHz frequency band. The intra-band mode can be categorized into a contiguous intra-band mode in which the 320 MHz bandwidth channel is assigned contiguously within the designated frequency band, and a non-contiguous intra-band mode in which the 320 MHz bandwidth channel is split into two or more narrower frequency bandwidth channels that are separated from each other within the designated frequency band.

For example, in the case of the 6 GHz frequency band, the intra-band contiguous mode is referred to as 61, whereas the intra-band non-contiguous mode is referred to as 62. Although the 320 MHz bandwidth channel is shown to be aligned with the 5.925 GHz in the present example of the 6 GHz intra-band contiguous mode 61, it is understood that the 320 MHz bandwidth channel can be assigned anywhere within the 6 GHz frequency band. Similarly, the intra-band non-contiguous mode 62 can be assigned anywhere within the 6 GHz frequency band as long as the 320 MHz bandwidth channel is split into two or more narrower frequency bands. It is also possible that a contiguous intra-band mode 65 can include a 320 MHz bandwidth channel in the 5 GHz frequency band.

In the inter-band mode, the wireless communication system can be configured to utilize at least one channel bandwidth in the in the 5 GHz frequency band and at least one channel bandwidth in the 6 GHz frequency band. For example, an inter-band mode 63 has a first 160 MHz bandwidth channel in the 5 GHz frequency band and a second 160 MHz bandwidth channel in the 6 GHz frequency band. In another example, an inter-band mode 64 has two non-contiguous 80 MHz bandwidth channels in the 5 GHz frequency band and a 160 MHz bandwidth channel in the 6 GHz frequency band.

Figure 6:
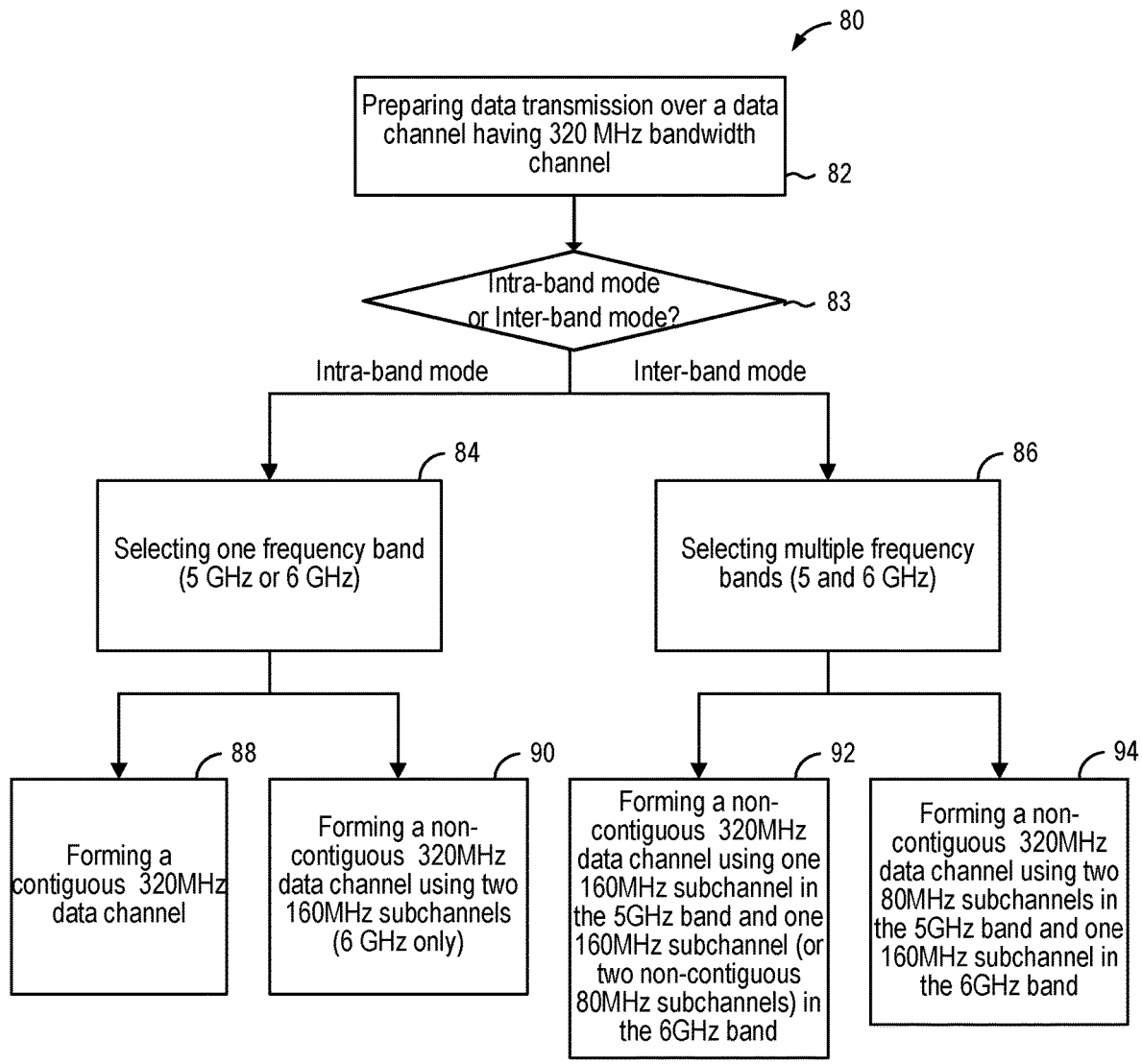
FIG. 6 is a flowchart for using the 320 MHz bandwidth channel in various modes according to some embodiments.

FIG. 6 is a flowchart 80 for using the 320 MHz bandwidth channel in various modes according to some embodiments. The wireless device and/or the wireless communication network prepare data transmission over a data channel having 320 MHz bandwidth channel (at 82) and determine to configure the 320 MHz bandwidth channel in an intra-band mode or an inter-band mode (at 83). The data channel can be wider than the primary channel.

In the intra-band mode, one frequency band (either the 5 GHz or 6 GHz frequency band) is selected to assign the 320 MHz bandwidth channel (at 84). The 320 MHz bandwidth channel may be assigned in a contiguous mode in either the 5 GHz or 6 GHz frequency band (at 88) or in a non-contiguous mode using two separate 160 MHz subchannels (at 90). According to one embodiment, the two separate 160 MHz subchannels may be assigned only in the 6 GHz frequency band.

In the inter-band mode, multiple frequency bands are selected to assign the 320 MHz bandwidth channel in the 5 GHz and 6 GHz frequency bands (at 86). The 320 MHz bandwidth channel may be assigned in a non-contiguous mode including a first 160 MHz subchannel in the 5 GHz frequency band and a second 160 MHz subchannel (alternatively two 80 MHz subchannels) in the 6 GHz frequency band (at 92). Alternatively, the 320 MHz bandwidth channel may be assigned in a non-contiguous mode including two 80 MHz subchannels in the 5 GHz frequency band and one 160 MHz subchannel in the 6 GHz frequency band (at 94).

(3) Flexible Band Aggregation

The present systems and methods define flexible band aggregation. The flexible band aggregation can increase the peak PHY rate, and the station can monitor multiple primary channels simultaneously to maximize channel access.

According to one embodiment, the present systems and methods support various bandwidth options and flexible band aggregation using multiple subchannels in the available 2.4 GHz, 5 GHz, and 6 GHz frequency bands. The flexible band aggregation may be in any of an inter-band contiguous mode, an intra-band non-contiguous mode, and an inter-band non-contiguous mode depending on the size of subchannel bandwidth and the number of the subchannels.

Figure 7:
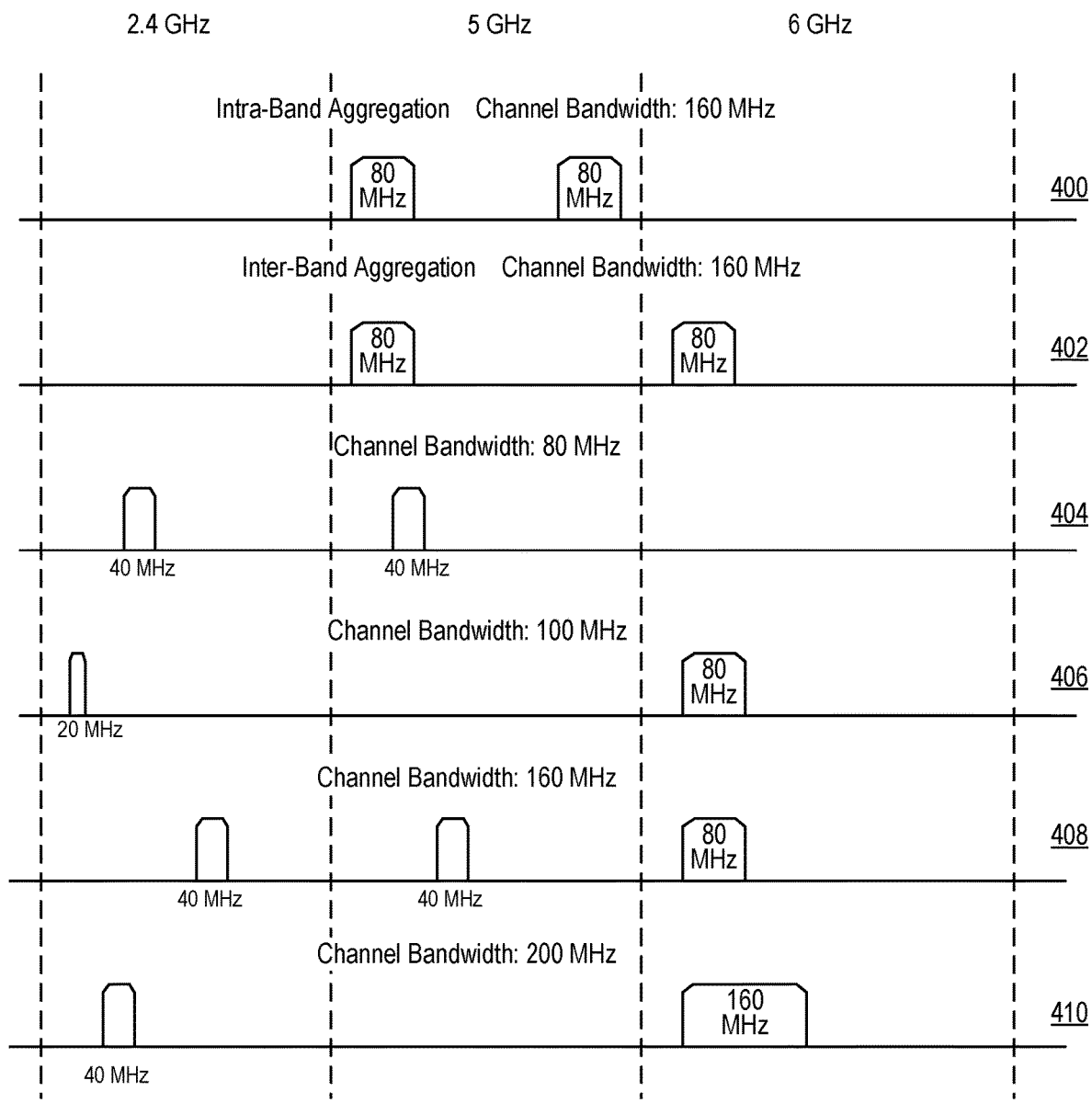
FIG. 7 illustrates examples of flexible band aggregation according to some embodiments.

FIG. 7 illustrates examples of flexible band aggregation according to some embodiments. An intra-band non-contiguous mode 400 provides a channel bandwidth of 160 MHz including two subchannels of 80 MHz bandwidth in the 5 GHz frequency band. An inter-band non-contiguous mode 402 provides a channel bandwidth of 160 MHz including a first 80 MHz subchannel in the 5 GHz frequency band and a second 80 MHz subchannel in the 6 GHz frequency band. An inter-band non-contiguous mode 404 provides a channel bandwidth of 80 MHz including a first 40 MHz subchannel in the 2.4 GHz frequency band and a second 40 MHz subchannel in the 5 GHz frequency band. An inter-band non-contiguous mode 406 provides a channel bandwidth of 100 MHz including a 20 MHz subchannel in the 2.4 GHz frequency band and an 80 MHz subchannel in the 6 GHz (or 5 GHz) frequency band. An inter-band non-contiguous mode 408 provides a channel bandwidth of 160 MHz including a first 40 MHz subchannel in the 2.4 GHz frequency band, a second 40 MHz subchannel in the 5 GHz frequency band, and one 80 MHz subchannel in the 6 GHz (or 5 GHz) frequency band. An inter-band non-contiguous mode 410 provides a channel bandwidth of 200 MHz including a 40 MHz subchannel in the 2.4 GHz frequency band and a 160 MHz subchannel in the 6 GHz (or 5 GHz) frequency band.

It is understood that many other bandwidth options and subchannel aggregation options are possible without deviating from the scope of the present disclosure. For example, the present systems and methods can support bandwidth options including, but not limited to, 40 MHz, 60 MHz, 80 MHz, 100 MHz, 120 MHz, 160 MHz, 180 MHz, 200 MHz, 240 MHz, and 320 MHz frequency bandwidths. Examples of the 40 MHz bandwidth channel include, but are not limited to, 1) a first 20 MHz subchannel in the 2.4 GHz frequency band and a second 20 MHz subchannel in the 5 GHz frequency band, and 2) two 20 MHz subchannels in the 2.4 GHz frequency band. Examples of the 60 MHz bandwidth channel include, but are not limited to, 1) a 20 MHz subchannel in the 2.4 GHz frequency band and a 40 MHz subchannel in the 5 GHz frequency band, 2) a 40 MHz subchannel in the 2.4 GHz frequency band and a 20 MHz subchannel in the 5 GHz frequency band, and 3) two 20 MHz subchannels in the 2.4 GHz frequency band and another 20 MHz subchannel in the 5 GHz frequency band. Another example of the 80 MHz bandwidth channel in addition to the inter-band non-contiguous mode 404 includes, but is not limited to, two 20 MHz subchannel in the 2.4 GHz frequency band and a 40 MHz subchannel in the 5 GHz frequency band. Examples of the 120 MHz bandwidth channel include, but are not limited to, 1) a 40 MHz subchannel in the 2.4 GHz frequency band and a 80 MHz subchannel in the 5 GHz or 6 GHz frequency band, and 2) two 20 MHz subchannels in the 2.4 GHz frequency band and a 80 MHz subchannel in the 5 GHz or 6 GHz frequency band. An example of the 180 MHz bandwidth channel includes, but is not limited to, a 20 MHz subchannel in the 2.4 GHz frequency band and a 160 MHz subchannel in the 5 GHz or 6 GHz frequency band. Another example of the 200 MHz bandwidth channel in addition to the inter-band non-contiguous mode 410 includes, but is not limited to, two 20 MHz subchannel in the 2.4 GHz frequency band and a 160 MHz subchannel in the 5 GHz or 6 GHz frequency band. An example of the 240 MHz bandwidth channel includes, but is not limited to, a first 80 MHz subchannel in the 5 GHz frequency band, a second 80 MHz subchannel in the 5 GHz or 6 GHz frequency band, and a third 80 MHz subchannel in the 5 GHz or 6 GHz frequency band. Some examples of the 320 MHz bandwidth channel are shown in FIG. 5.

(4) Primary Channel Configuration

According to one embodiment, the present systems and methods define multiple primary channels. In this case, some STAs can have multiple primary channels. If one of the primary channels is clear, the STA can access the cleared primary channel.

Each of the multiple primary channels may be assigned an inter-band channel mode within a corresponding frequency band among the 2.4 GHz, 5 GHz, and 6 GHz frequency bands. The present systems and methods can provide multiple primary channels for a wireless station in two or more of the 2.4 GHz, 5 GHz, and 6 GHz frequency bands. The multiple primary channels can maximize the station's channel accessibility.

Figure 8:
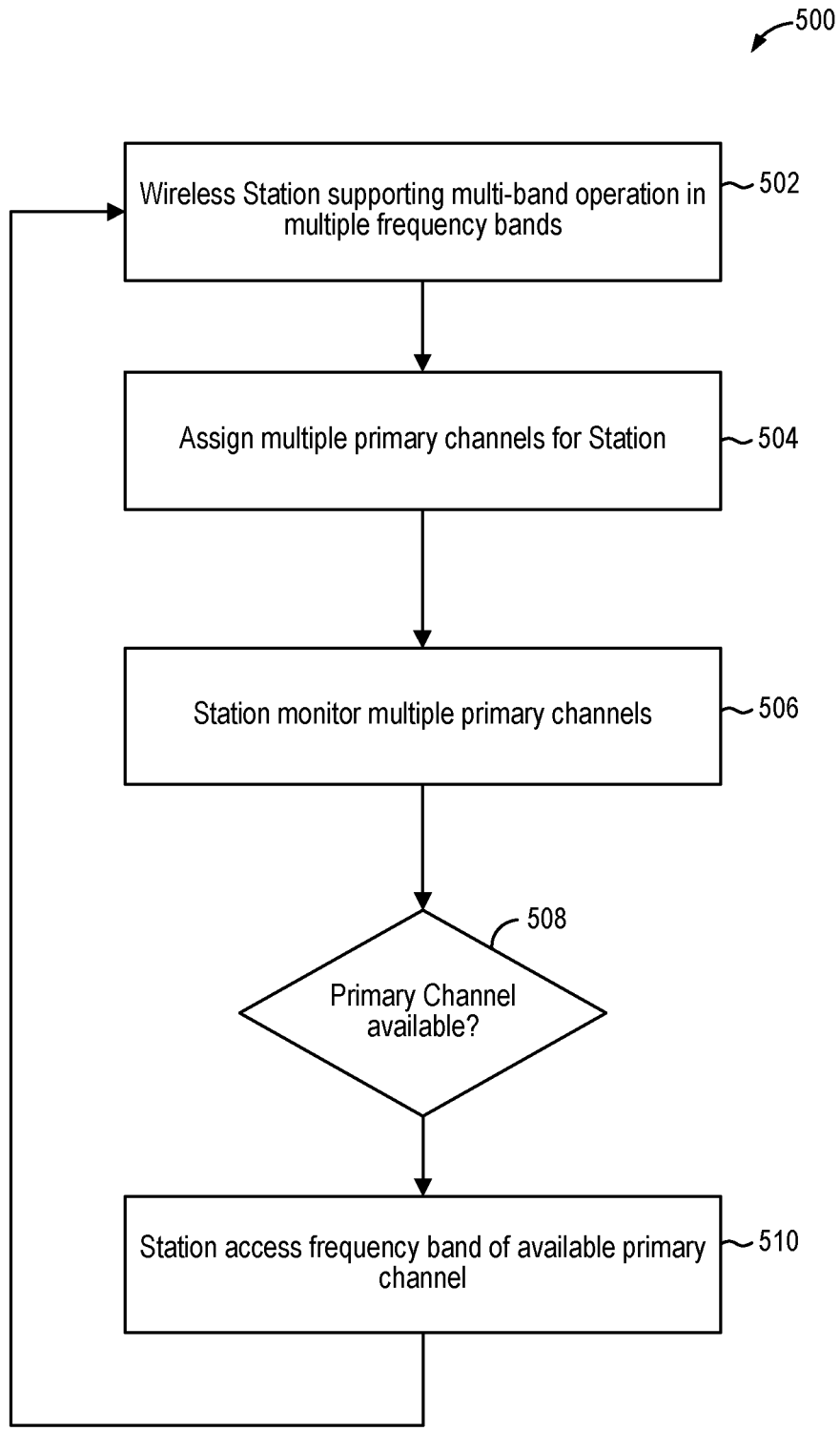
FIG. 8 is a flowchart for selecting a primary channel to a wireless station according to one embodiment.

FIG. 8 is a flowchart 500 for selecting a primary channel to a wireless station according to one embodiment. The wireless station in a wireless communication network is configured to support a multiple frequency band operation in multiple frequency bands (at 502). For example, the multiple frequency bands includes at least one of the 2.4 GHz and 5 GHz frequency bands and the 6 GHz frequency band. Depending on the multiple frequency bands assigned, multiple primary channels are assigned to the wireless station (at 504). The wireless station can monitor availability and accessibility of the multiple primary channels (at 506). If a primary channel among the multiple primary channels is available (at 508), the wireless station accesses the frequency band of the available primary channel for data communication with another wireless station or an access point (at 510). In some case, the access point and the wireless station can negotiate/enable only one of the primary channels. For example, if the wireless station enters an idle mode, the access point may send data via a primary channel of a lower frequency band.

(4b) Station-Specific Primary Channel

According to one embodiment, the present systems and methods provide a station-specific primary channel. The station-specific primary channel can enable load balancing especially for a wide channel bandwidth. For example, in an existing system, within a 160 MHz basic service set (BSS), there is only one primary channel. If only few of the wireless stations support the 160 MHz bandwidth, then a secondary 80 MHz would be unusable because all the data packet transmission need to include the primary channel. For example, if STAs operate on the 80 MHz mode, the second 80 MHz bandwidth (without primary channel) cannot be used. If there is another primary channel on the second 80 MHz bandwidth, some STA can be assigned to the second 80 MHz bandwidth, and there will be more chance to utilize the second 80 MHz channel. In this embodiment, there can be one primary channel for some wireless stations in the lower 80 MHz channel and another primary channel for other wireless stations in the upper 80 MHz channel. Because different wireless stations in the same BSS bandwidth (e.g., the 2.4 GHz, 5 GHz, and 6 GHz frequency bands) can communicate on different 80 MHz frequency bands within the same BSS bandwidth, the access point can load balance across the whole operation band.

Figure 9:
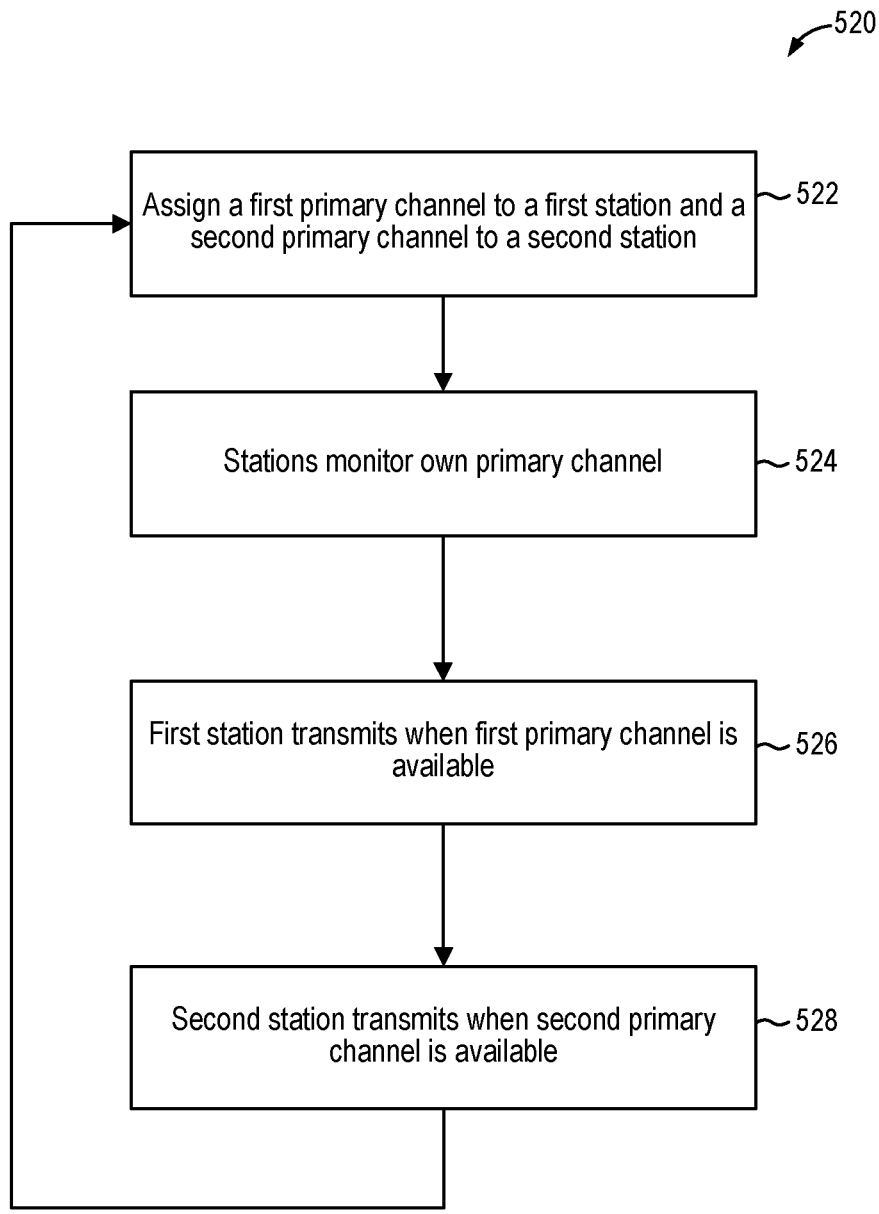
FIG. 9 is a flowchart for assigning station-specific primary channels to a plurality of wireless stations according to one embodiment.

FIG. 9 is a flowchart 520 for assigning station-specific primary channels to a plurality of wireless stations according to one embodiment. An access point assigns a first primary channel (e.g., an upper 80 MHz frequency band within a BSS bandwidth) to a first wireless station and a second primary channel (e.g., a lower 80 MHz frequency band within the same BSS bandwidth) to a second wireless station (at 522). Each of the first and second wireless stations monitors its own primary channel (at 524). The first wireless station transmits data packets when the first primary channel is available (at 526), and the second wireless stations transmits data packets when the second primary channel is available (at 528). The processes 522-528 repeats. The access point may assign the first primary channel to the second wireless station or assign the second primary channel to the first wireless station to balance the workload. The access point may assign the first primary channel or the second primary channel to a new wireless station depending on the load in each of the first and second primary channels.

(4c) Multiple Resource Unit Allocation

According one embodiment, the present wireless systems and methods utilize orthogonal frequency-division multiple access (OFDMA) to support multiple users. Resource unit (RU) in OFDMA used in the IEEE 802.11ax standard denotes a group of subcarriers (or tones) used in both downlink (DL) and uplink transmissions. With OFDMA, different transmit powers may be applied to different RUs. There are maximum of 9 RUs for a 20 MHz channel, 18 in case of a 40 MHz channel and more in case of an 80 or 160 MHz channel. The RUs enable an access point to allow multiple users to access the access point simultaneously and efficiently. In the IEEE 802.11ax standard, each STA can only be allocated to one RU.

According to one embodiment, multiple RUs can be allocated to a single wireless station. Multiple RU allocation provides more flexible and efficient utilization of the available channels.

According to one embodiment, the present systems and methods support multiple resource unit allocation. For example, the present systems and methods support 26-tone RU plus 26-tone RU, 26-tone RU plus 52-tone RU, 242-tone RU plus 996-tone RU, etc. allocated to a single wireless station.

(5) Multiple Frequency Band Operation

According to one embodiment, the present systems and method utilize multiple channels across the tri-frequency bands including 2.4 GHz, 5 GHz, and 6 GHz frequency bands to increase the Wi-Fi throughput. The Wi-Fi throughput increase may be achieved in various ways, for example, by providing simultaneous active links on multiple frequency bands or providing separate uplink and downlink in separate frequency bands.

(5a) Simultaneous Active Links on Multiple Frequency Bands

According to one embodiment, the access point and the wireless station maintain more than one active links. For example, two active links in the 2.4 GHz and 6 GHz frequency bands are assigned to one wireless station. In another example, two active links in the 5 GHz and 6 GHz frequency bands are assigned to another wireless station. The access point and the wireless station can exchange data packets over the multiple channels in more than one frequency bands to increase the data throughput. The multiple frequency band data transmission may be done in a synchronous manner or an asynchronous manner.

According to one embodiment, the present systems and methods allow simultaneous transmission of data packets across the multiple frequency bands of the active links. In a synchronous multiple frequency band data transmission scheme, the simultaneous transmission of data packets across the multiple frequency bands can increase a peak PHY rate.

Figure 10A:
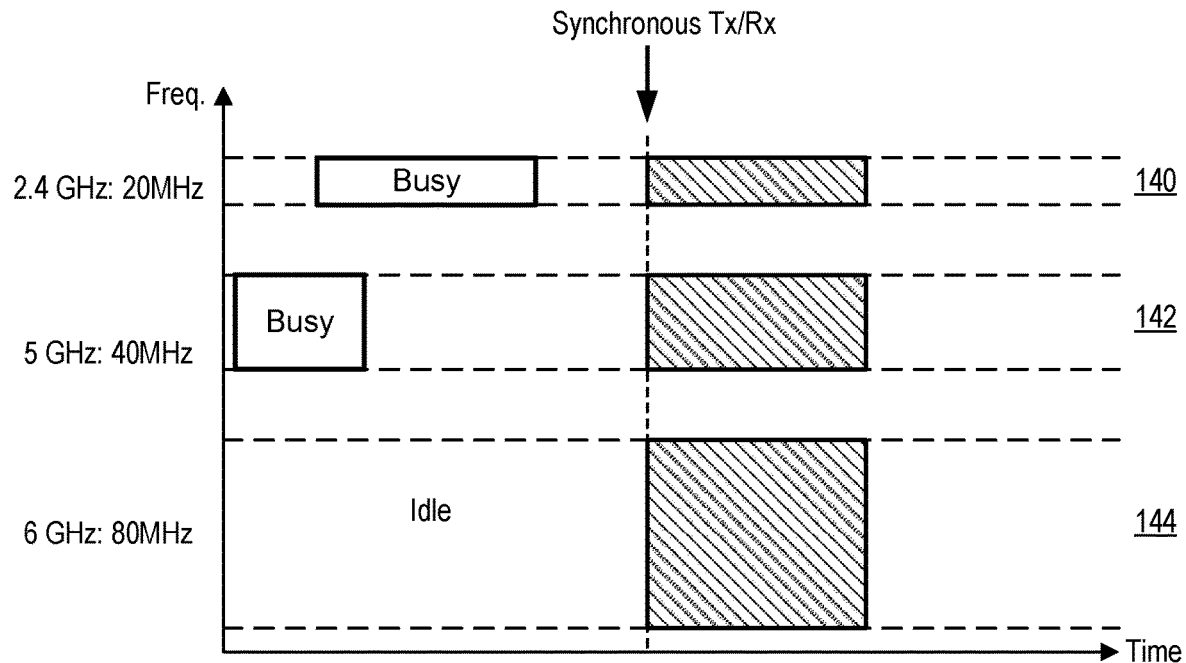
FIG. 10A illustrates an example of a synchronous multiple band data transmission scheme according to one embodiment.

FIG. 10A illustrates an example of a synchronous multiple band data transmission scheme according to one embodiment. In the present example, a 140 MHz channel is assigned to a wireless station including a channel 140 having a 20 MHz bandwidth in the 2.4 GHz frequency band, a channel 142 having a 40 MHz bandwidth in the 5 GHz frequency band, and a channel 144 having a 80 MHz bandwidth in the 6 GHz frequency band.

The wireless station can synchronously transmit data packets on the multiple channels in the 2.4 GHz, 5 GHz, and 6 GHz frequency bands when all of the multiple channels are idle. If any of the multiple channels is busy, the wireless station may defer the data transmission until all of the multiple channels become idle. If one or more of the multiple channels are busy, there will be a less chance to access the multiple channels simultaneously.

In the present example, three multiple channels are shown in each of the 2.4 GHz, 5 GHz, and 6 GHz frequency bands with different bandwidth channels. However, it is understood that different sizes and number of multiple channels may be used without deviating from the scope of the present disclosure. For example, a 320 MHz channel may include a first 160 MHz channel in the 5 GHz frequency band and a second 160 MHz channel in the 6 GHz frequency band.

Figure 10B:
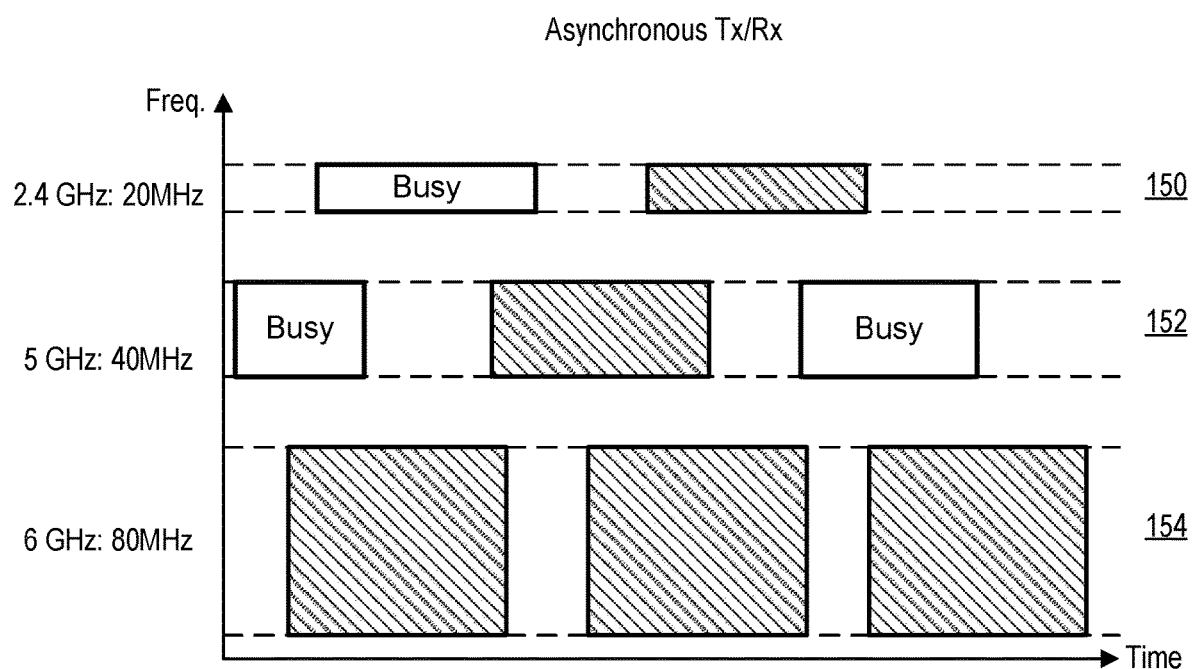
FIG. 10B illustrates an example of an asynchronous multiple frequency band transmission scheme according to one embodiment.

FIG. 10B illustrates an example of an asynchronous multiple frequency band transmission scheme according to one embodiment. Similar to the example of FIG. 10A, a 140 MHz channel is assigned to a wireless station including a channel 150 having a 20 MHz bandwidth in the 2.4 GHz frequency band, a channel 152 having a 40 MHz bandwidth in the 5 GHz frequency band, and a channel 154 having a 80 MHz bandwidth in the 6 GHz frequency band. Instead of waiting for all of the channels 150, 152, and 154 becomes idle, the wireless station may asynchronously transmit data packets in any one or more frequency bands when at least one channel of the multiple channels is idle. This approach increases a chance to access the medium and results in higher throughput compared to the synchronous approach when the medium is busy. This can also increase the effective media access control (MAC) throughput. Since the asynchronous multiple frequency band channel access in the unlicensed spectrum (i.e., the 6 GHz frequency band), it can also increase the throughput compared to the current IEEE 802.11 ax standard. In addition, the simultaneous active links on multiple frequency bands increases reliability because the wireless station may transmit packets with same MAC Protocol Data Units (MPDUs) in different channels.

(5b) Separate Uplink and Downlink in Separate Frequency Bands

According to one embodiment, the present systems and methods provide separate uplink (station to access point) and downlink (access point to station) in separate frequency bands.

Figure 11:
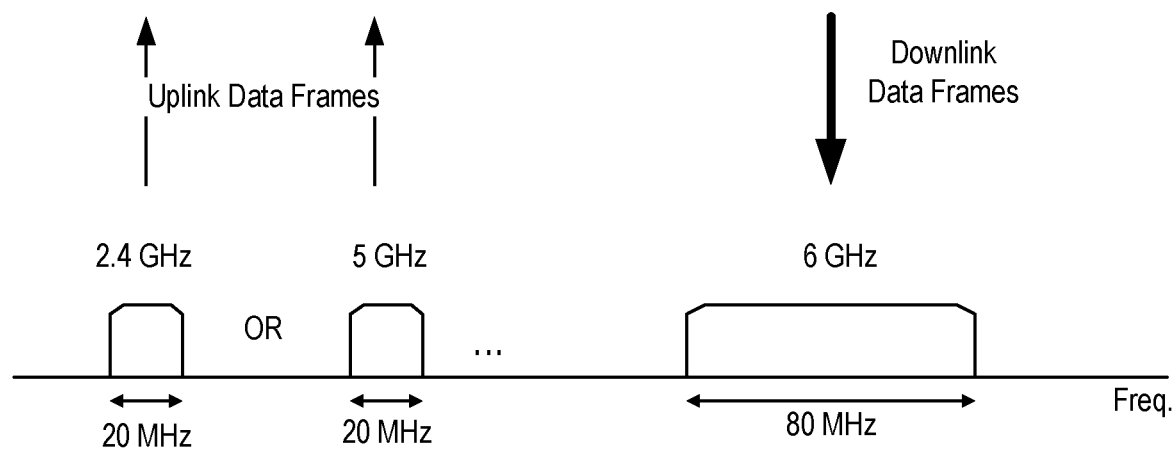
FIG. 11 illustrates an example of using separate uplink and downlink channels in separate frequency bands according to one embodiment.

FIG. 11 illustrates an example of using separate uplink and downlink channels in separate frequency bands according to one embodiment. A 20 MHz channel is assigned in either the 2.4 GHz frequency band or the 5 GHz frequency band, and an 80 MHz channel is assigned in the 6 GHz frequency band. Since an access point has a higher transmit power than a station, downlink may use the wide 80 MHz frequency band in the 6 GHz frequency band, and uplink may use a narrow 20 MHz frequency either in the 2.4 or 5 GHz frequency band. Different bandwidths for each of the multiple frequency bands may be used without deviating from the scope of the present disclosure. The separation of uplink and downlink in different frequency bands can eliminate a link asymmetry problem between uplink and downlink that may occur when the same frequency bands are used for uplink and downlink.

(6) Management Frames and Data Frames in Separate Bands

According to one embodiment, the present systems and methods use separate management plane and data plane in different frequency bands. The separation of the management and data frames would unclutter the 6 GHz frequency band that carries large data frames with small management frames that can degrade the throughput.

Figure 12:
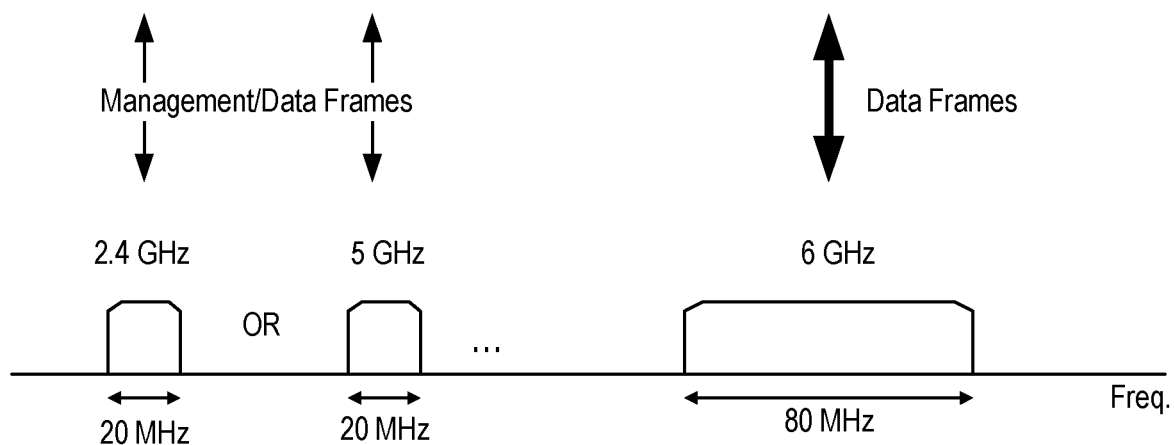
FIG. 12 illustrates an example of providing separate channels for transmitting management and data frames in separate frequency bands according to one embodiment.

FIG. 12 illustrates an example of providing separate channels for transmitting management and data frames in separate frequency bands according to one embodiment. Management frames are small compared to data frames. The management plane includes management frame transmissions such as beacon, association request/response, probe request/response. The data plane includes data frame transmissions.

According to one embodiment, management frames may be transmitted in the 2.4 or 5 GHz frequency band while data frames that are typically larger than management frames for high-throughput applications may be transmitted in the 6 GHz frequency band. In some embodiments, data frames may be transmitted in the 2.4 and/or 5 GHz frequency band(s) in addition to the 6 GHz frequency band. For example, Data/BlockAck exchange frames can be in a same channel (e.g., the 6 GHz frequency band) or BlockAck transmission may be delayed and transmitted on a different channel (e.g., the 2.4 or 5 GHz frequency band) as a response to a BlockAck Request.

Separate transmission of management frames and data frames in different frequency bands may achieve a high data throughput. Simultaneous operation in the 5 GHz and the 6 GHz frequency bands may need a careful selection of the channels due to closer proximity compared to the 2.4/5 GHz and the 2.4/6 GHz frequency bands.

Access Point Multiple Frequency Band Communication Method

Figure 13:
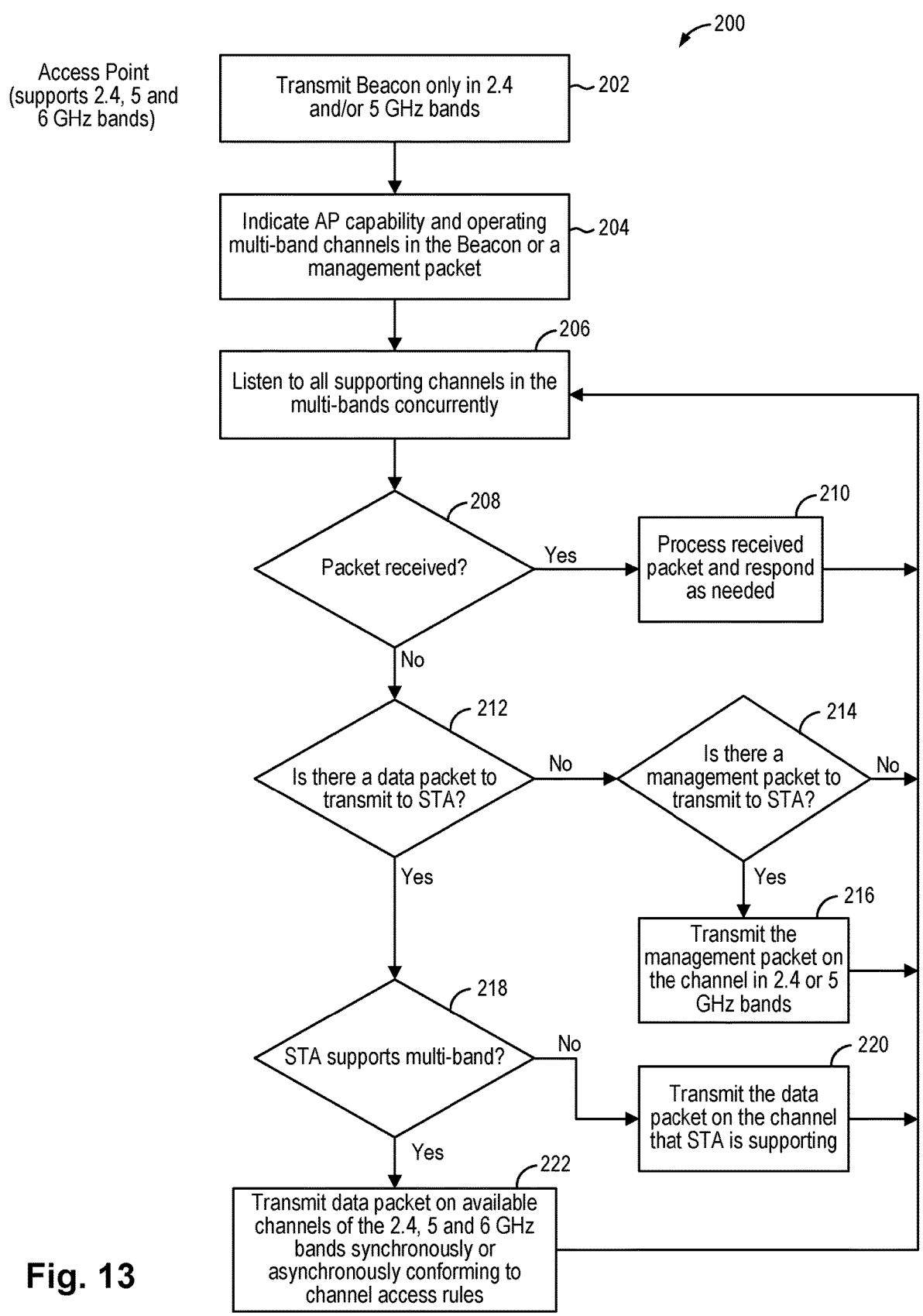
FIG. 13 is a flowchart for enabling an access point to communicate on multiple frequency bands in a single BSS according to one embodiment.

FIG. 13 is a flowchart 200 for enabling an access point to communicate on multiple frequency bands in a single BSS according to one embodiment. The access point supports all of the 2.4 GHz, 5 GHz, and 6 GHz frequency bands. The access point transmits a beacon only in the 2.4 GHz and/or 5 GHz frequency bands to wireless stations in a wireless communication network (at 202). The beacon or a management packet may indicate the access point's capability of operating on multiple frequency channels (at 204). The access point listens to all of the supporting channels in the multiple frequency bands concurrently to check if any packet is received from any of the associated wireless stations (at 206). If the access point receives a packet (at 208), the access point processes the received packet and responds as needed (at 210). After processing the received packets, the access point continues to listen to all of the supporting channels in the multiple frequency bands (at 206). If the access point receives no packet (at 208), the access point checks if there is a data packet to transmit to a wireless station (at 212). If there is a data packet to transmit, the access point checks if the receiving wireless station supports multiple frequency bands (at 218). If the wireless station supports multiple frequency bands, the access point transmits the data packet on available channels of the 2.4 GHz, 5 GHz, and/or 6 GHz frequency bands synchronously or asynchronously conforming to channel access rules (at 222), otherwise the access point transmits the data packet on a specific channel that the wireless station supports (at 220). If there is no data packet to transmit, the access point checks if there is a management packet to transmit to the wireless station (at 214). If there is a management packet to transmit (at 214), the access point transmits the management packet on one of the channels of the 2.4 GHz, 5 GHz, and 6 GHz frequency bands (at 216). After processing the data packet or the management packet, the access point listens to all of the supporting channels in the multiple frequency bands concurrently to check if a packet is received from any of the associated wireless stations (at 206).

Wireless Station Multiple Frequency Band Communication Method

Figure 14:
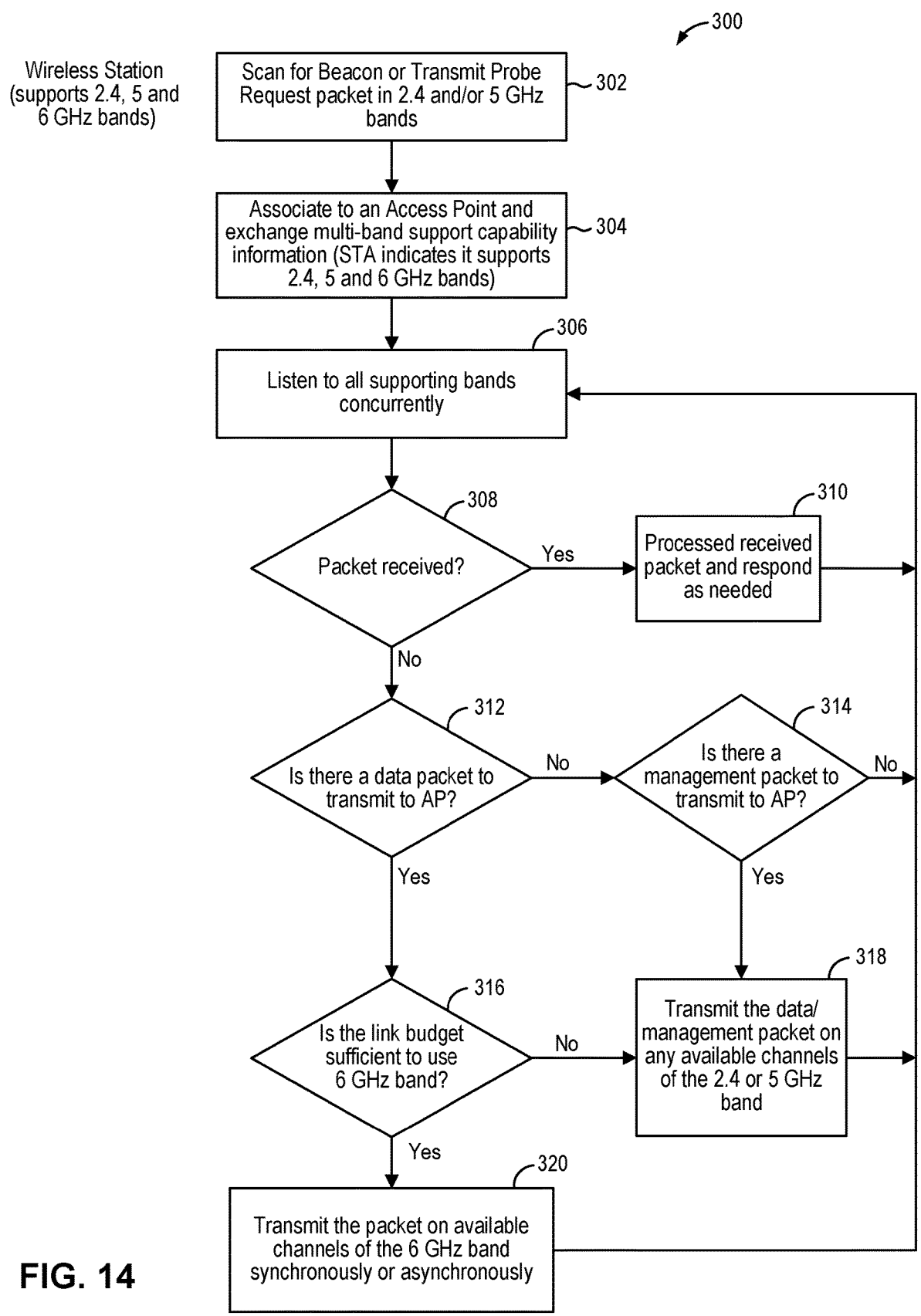
FIG. 14 is a flowchart for enabling a wireless station to communicate on multiple frequency bands in a single BSS according to one embodiment.

FIG. 14 is a flowchart 300 for enabling a wireless station to communicate on multiple frequency bands in a single BSS according to one embodiment. The wireless station supports two or more of the 2.4 GHz, 5 GHz, and 6 GHz frequency bands. The wireless station scans for a beacon from an access point or transmit a probe request packet to any access point in a wireless communication network (at 302). The wireless station associates to an access point and exchange multiple frequency band support capability information indicating that the wireless station support two or more of the 2.4 GHz, 5 GHz, and 6 GHz frequency bands (at 304). The wireless station listens to all of the supporting channels in the multiple frequency bands concurrently to check if any packet is received from any of the associated access points (at 306). If the wireless station receives a packet (at 308), the wireless station processes the received packet and responds as needed (at 310). After processing the received packets, the wireless station continues to listen to all of the supporting channels in the multiple frequency bands (at 306). If the wireless station receives no packet (at 308), the wireless station checks if there is a data packet to transmit to an access point (at 312). If there is a data packet to transmit, the wireless station checks if the link budget is sufficient to use the 6 GHz frequency band (at 316). If the link budget is sufficient to use the 6 GHz frequency band, the wireless station transmits the data packet on available channels of the 6 GHz frequency band synchronously or asynchronously (at 320), otherwise the wireless station transmits the data packet on any available channels of the 2.4 GHz frequency band or the 5 GHz frequency band (at 318). If there is no data packet to transmit, the wireless station checks if there is a management packet to transmit to the access point (at 314). If there is a management packet to transmit (at 314), the wireless station transmits the management packet on one of the channels of the 2.4 GHz and 5 GHz frequency bands (at 318). After processing the data packet or the management packet, the wireless station listens to all of the supporting channels in the multiple frequency bands concurrently to check if a packet is received from any of the associated access points (at 306).

According to one embodiment, a method for allowing wireless communication between an access point and a wireless station in a wireless communication network includes: providing at least one from a combination of a 2.4 GHz frequency band and a 5 GHz frequency band; providing a frequency band including a 6 GHz frequency band for allowing wireless data communication; assigning a first data communication channel having a first frequency bandwidth in the frequency band including the 6 GHz frequency band between the access point and the wireless station; and transmitting data packets between the access point and the wireless station via the first data communication channel in the frequency band including the 6 GHz frequency band. Each of the 2.4 GHz frequency band and the 5 GHz frequency band includes a plurality of subchannels having a first base frequency bandwidth of 20 MHz, and the frequency band including the 6 GHz frequency band includes a plurality of subchannels having a second base frequency bandwidth that is larger than the first base frequency bandwidth.

The frequency band including the 6 GHz frequency band may range from 5.925 GHz to 7.125 GHz. The second base frequency bandwidth may be 80 MHz. The data packets may be transmitted via two or more subchannels that are contiguous or non-contiguous in the first data communication channel.

The method may further include: assigning a second data communication channel having a second frequency bandwidth in the 2.4 GHz frequency band or the 5 GHz frequency band between the access point and the wireless station; and transmitting the data packets between the access point and the wireless station via the second data communication channel in the 2.4 GHz frequency band or the 5 GHz frequency band.

The data packets may be transmitted partly in the first data communication channel and partly in the second data communication channel, and a sum of the first frequency bandwidth and the second frequency bandwidth may be up to 320 MHz or smaller.

A first portion of the data packets transmitted partly in the first data communication channel may be split into a first group of subchannels that are contiguous or non-contiguous in the first data communication channel, and a second portion of the data packets transmitted partly in the second data communication channel may be split into a second group of subchannels that are contiguous or non-contiguous in the second data communication channel.

The method may further include: assigning a plurality of primary channels for the wireless station in the frequency band including the 6 GHz frequency band and at least one of the 2.4 GHz frequency band and the 5 GHz frequency band; monitoring the plurality of primary channels and determining an available primary channel among the plurality of primary channels; and accessing a frequency band of the available primary channel.

The method may further include: assigning a primary channel for the wireless station in the frequency band including the 6 GHz frequency band; assigning a second primary channel for a second wireless station in the wireless communication network in one or more of the 2.4 GHz frequency band and the 5 GHz frequency band; and transmitting the data packets between the access point and the second wireless station via the second data communication channel including the channel containing the second primary channel.

The method may further include: synchronously transmitting portions of the data packets between the access point and the wireless station via both the first data communication channel in the frequency band including the 6 GHz frequency band and the second data communication channel in the 2.4 GHz frequency band or the 5 GHz frequency band when both the first data communication channel and the second data communication channel are idle.

The method may further include: asynchronously transmitting portions of the data packets between the access point and the wireless station via both the first data communication channel in the frequency band including the 6 GHz frequency band and the second data communication channel in the 2.4 GHz frequency band or the 5 GHz frequency band when any of the first data communication channel and the second data communication channel is idle.

The method may further include: transmitting downlink data frames via the first data communication channel in the frequency band including the 6 GHz frequency band; and transmitting uplink data frames via the second data communication channel in the 2.4 GHz frequency band or the 5 GHz frequency band.

The method may further include: transmitting data frames via the first data communication channel in the frequency band including the 6 GHz frequency band; and transmitting management frames via the second data communication channel in the 2.4 GHz frequency band or the 5 GHz frequency band.

According to another embodiment, a wireless data communication system includes: an access point; and a wireless station capable of communicating with the access point. The wireless communication system provides at least one of a 2.4 GHz frequency band and a 5 GHz frequency band for allowing wireless data communication between the access point and the wireless station, and wherein each of the 2.4 GHz frequency band and the 5 GHz frequency band includes a plurality of subchannels having a first base frequency bandwidth of 20 MHz. The wireless communication system further provides a frequency band including a 6 GHz frequency band for allowing wireless data communication between the access point and the wireless station, and wherein the frequency band including the 6 GHz frequency band includes a plurality of subchannels having a second base frequency bandwidth that is larger than the first base frequency bandwidth. The wireless communication system assigns a first data communication channel having a first frequency bandwidth in the frequency band including the 6 GHz frequency band between the access point and the wireless station. The wireless communication system transmits data packets between the access point and the wireless station via the first data communication channel in the frequency band including the 6 GHz frequency band.

The frequency band including the 6 GHz frequency band may range from 5.925 GHz to 7.125 GHz. The second base frequency bandwidth may be 80 MHz. The data packets may be transmitted via two or more subchannels that are contiguous or non-contiguous in the first data communication channel.

The wireless communication system may further: assign a second data communication channel having a second frequency bandwidth in the 2.4 GHz frequency band or the 5 GHz frequency band between the access point and the wireless station; and transmit the data packets between the access point and the wireless station via the second data communication channel in the 2.4 GHz frequency band or the 5 GHz frequency band.

The data packets may be transmitted partly in the first data communication channel and partly in the second data communication channel, and a sum of the first frequency bandwidth and the second frequency bandwidth may be up to 320 MHz or smaller.

A first portion of the data packets transmitted partly in the first data communication channel may be split into a first group of subchannels that are contiguous or non-contiguous in the first data communication channel, and a second portion of the data packets transmitted partly in the second data communication channel may be split into a second group of subchannels that are contiguous or non-contiguous in the second data communication channel.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method comprising:
    allocating a multiple resource unit (MRU) for a data communication channel in at least one of a 2.4 GHz frequency band or a 5 GHz frequency band, and in a 6 GHz frequency band, for wireless data communication between an access point and a wireless station in a wireless communication network;
    assigning a first data communication channel having a first frequency bandwidth in the 6 GHz frequency band between the access point and the wireless station;

assigning a second data communication channel having a second frequency bandwidth in the 2.4 GHz frequency band or the 5 GHz frequency band between the access point and the wireless station; and transmitting first data packets having a first size via the first data communication channel in the 6 GHz frequency band and second data packets having a second size smaller than the first size via the second data communication channel in the 2.4 GHz frequency band or the 5 GHz frequency band, wherein at least one of the first data communication channel or second data communication channel uses the MRU.

2. The method of claim 1, wherein the MRU is a combination of at least two resource units (RUs).

3. The method of claim 2, wherein the combination of RUs includes at least one of a: 26-tone RU, 52-tone RU, 242-tone RU, or 996-tone RU.

4. The method of claim 2, wherein the MRU is a combination of at least two different resource units (RUs).

5. The method of claim 1, wherein the first data packets are transmitted via two or more subchannels that are contiguous or non-contiguous in the first data communication channel.

6. The method of claim 1, wherein the first data packets are transmitted partly in the first data communication channel and partly in the second data communication channel, and wherein the first frequency bandwidth is 160 MHz, and the second frequency bandwidth is 160 MHz.

7. The method of claim 6, wherein a first portion of the first data packets transmitted partly in the first data communication channel is split into a first group of subchannels that are contiguous or non-contiguous in the first data communication channel, and a second portion of the first data packets transmitted partly in the second data communication channel is split into a second group of subchannels that are contiguous or non-contiguous in the second data communication channel.

8. The method of claim 1, further comprising:
assigning one or more primary channels for the wireless station in the frequency band including the 6 GHz frequency band and at least one of the 2.4 GHz frequency band or the 5 GHz frequency band;
monitoring the primary channels and determining an available primary channel among the primary channels; and
accessing a frequency band of the available primary channel.

9. The method of claim 1, further comprising:
assigning a primary channel for the wireless station in the frequency band including the 6 GHz frequency band;
assigning a second primary channel for a second wireless station in the wireless communication network in one or more of the 2.4 GHz frequency band and the 5 GHz frequency band; and
transmitting the first data packets via the second data communication channel including the second primary channel.

10. The method of claim 1, further comprising:
synchronously transmitting portions of the first data packets via both the first data communication channel in the frequency band including the 6 GHz frequency band and the second data communication channel in the 2.4 GHz frequency band or the 5 GHz frequency band when both the first data communication channel and the second data communication channel are idle.

11. The method of claim 1, further comprising:
asynchronously transmitting portions of the first data packets via both the first data communication channel in the frequency band including the 6 GHz frequency band and the second data communication channel in the 2.4 GHz frequency band or the 5 GHz frequency band when any of the first data communication channel and the second data communication channel is idle.

12. The method of claim 1, further comprising:
transmitting downlink data frames via the first data communication channel in the frequency band including the 6 GHz frequency band; and
transmitting uplink data frames via the second data communication channel in the 2.4 GHz frequency band or the 5 GHz frequency band.

13. The method of claim 1, further comprising:
transmitting data frames via the first data communication channel in the frequency band including the 6 GHz frequency band; and
transmitting management frames via the second data communication channel in the 2.4 GHz frequency band or the 5 GHz frequency band.

14. A wireless data communication system comprising:
an access point; and
a wireless station capable of communicating with the access point,
wherein the wireless communication system allocates a multiple resource unit (MRU) for a data communication channel in at least one of a 2.4 GHz frequency band or a 5 GHz frequency band, and in a 6 GHz frequency band for wireless data communication between the access point and the wireless station,
wherein the wireless communication system assigns a first data communication channel having a first frequency bandwidth in the 6 GHz frequency band between the access point and the wireless station and further assigns a second data communication channel having a second frequency bandwidth in the 2.4 GHz frequency band or the 5 GHz frequency band between the access point and the wireless station; and
wherein the wireless communication system transmits first data packets having a first size via the first data communication channel in the 6 GHz frequency band and second data packets having a second size smaller than the first size via the second data communication channel in the 2.4 GHz frequency band or the 5 GHz frequency band,
wherein at least one of the first data communication channel or second data communication channel uses the MRU.

15. The wireless data communication system of claim 14, wherein the MRU is a combination of at least two resource units (RUs).

16. The wireless data communication system of claim 15, wherein the combination of RUs includes at least one of a: 26-tone RU, 52-tone RU, 242-tone RU, or 996-tone RU.

17. The wireless data communication system of claim 15, wherein the MRU is a combination of at least two different resource units (RUs).

18. The wireless data communication system of claim 14, wherein the first data packets are transmitted partly in the first data communication channel and partly in the second data communication channel, and wherein the first frequency bandwidth is 160 MHz, and the second frequency bandwidth is 160 MHz.

19. The wireless data communication system of claim 18, wherein a first portion of the first data packets transmitted partly in the first data communication channel is split into a first group of subchannels that are contiguous or non-contiguous in the first data communication channel, and a second portion of the first data packets transmitted partly in the second data communication channel is split into a second group of subchannels that are contiguous or non-contiguous in the second data communication channel.

\* \* \* \* \*